(12) United States Patent
Milner et al.

(10) Patent No.: US 11,338,714 B2
(45) Date of Patent: May 24, 2022

(54) VEHICLE SEAT WITH CANTILEVERED HEADREST ASSEMBLY AND POSITIONING SYSTEM

(71) Applicant: Adient Engineering and IP GmbH, Burscheid (DE)

(72) Inventors: Mark Milner, Bingham Farms, MI (US); John Gomez, Howell, MI (US); Kurt Seibold, Farmington Hills, MI (US); Jeff Laho, Brighton, MI (US)

(73) Assignee: Adient US LLC, Plymouth, MI (US)

( * ) Notice: Subject to any disclaimer, the term of this patent is extended or adjusted under 35 U.S.C. 154(b) by 0 days.

(21) Appl. No.: 16/861,777

(22) Filed: Apr. 29, 2020

(65) Prior Publication Data

US 2020/0254914 A1 Aug. 13, 2020

Related U.S. Application Data

(62) Division of application No. 15/846,669, filed on Dec. 19, 2017, now Pat. No. 10,676,002.

(51) Int. Cl.
| | |
|---|---|
| *B60N 2/80* | (2018.01) |
| *B60N 2/829* | (2018.01) |
| *B60N 2/853* | (2018.01) |
| *B64D 11/06* | (2006.01) |
| *B60N 2/868* | (2018.01) |
| *B60N 2/809* | (2018.01) |

(52) U.S. Cl.
CPC ............. *B60N 2/829* (2018.02); *B60N 2/853* (2018.02); *B60N 2/809* (2018.02); *B60N 2/868* (2018.02); *B64D 11/0642* (2014.12)

(58) Field of Classification Search
CPC ........ B60N 2/868; B60N 2/829; B60N 2/853; B60N 2/809; B64D 11/0642; A47C 1/036; A47C 7/38; A47C 7/386
See application file for complete search history.

(56) References Cited

U.S. PATENT DOCUMENTS

| | | |
|---|---|---|
| 2,672,917 A | 3/1954 | Collura |
| 2,831,530 A | 4/1958 | Chiopelas et al. |
| 3,572,831 A | 3/1971 | Barecki et al. |
| 3,692,356 A | 9/1972 | Mertens |
| 4,688,852 A | 8/1987 | Arai et al. |
| 5,356,202 A | 10/1994 | Itoh |
| 6,573,673 B1 | 6/2003 | Hampel et al. |
| 6,616,236 B1 | 9/2003 | Su |
| 7,055,909 B2 | 6/2006 | Wu |
| 7,140,687 B2 | 11/2006 | Hoekstra et al. |
| 7,240,966 B2 | 7/2007 | Stone et al. |
| 7,303,232 B1 | 12/2007 | Chen |
| 7,369,928 B2 | 5/2008 | Wang et al. |
| 7,494,188 B1 | 2/2009 | Lin |
| 7,549,704 B1 | 6/2009 | Chou et al. |

(Continued)

*Primary Examiner* — Syed A Islam
(74) *Attorney, Agent, or Firm* — Marshall & Melhorn, LLC

(57) ABSTRACT

A headrest assembly for use in a vehicle seat. The headrest assembly includes one or more support arms that are connected to a seatback frame. An adjustable connection assembly connects at least a portion of the one or more support arms to at least a portion of the headrest body. The adjustable connection assembly allows the head rest body to move in a forward and rearward direction, to move in an up and down direction, and/or to pivot relative to the seatback frame of the vehicle seat.

20 Claims, 6 Drawing Sheets

(56) References Cited

U.S. PATENT DOCUMENTS

| | | | |
|---|---|---|---|
| 7,690,729 B2 | 4/2010 | Liao | |
| 7,735,929 B2 | 6/2010 | Veine et al. | |
| 7,832,803 B2 | 11/2010 | Cassaday | |
| 8,126,617 B2 | 2/2012 | Yetukuri et al. | |
| 8,622,472 B2 | 1/2014 | Rajaratnam | |
| 8,662,591 B2 | 3/2014 | Lin | |
| 9,380,878 B1 | 6/2016 | Chen | |
| 9,521,908 B1 * | 12/2016 | Beck | A47C 7/38 |
| 9,616,788 B2 * | 4/2017 | Tabata | A47C 7/38 |
| 9,758,076 B2 * | 9/2017 | An | B60N 2/0232 |
| 10,010,182 B1 | 7/2018 | Chen | |
| 10,238,215 B2 | 3/2019 | Peterson et al. | |
| 10,414,312 B2 * | 9/2019 | Fredriksson | B60N 2/879 |
| 2007/0085401 A1 | 4/2007 | Hunziker et al. | |
| 2012/0104807 A1 | 5/2012 | Lauchle et al. | |
| 2012/0193959 A1 | 8/2012 | Chen | |
| 2013/0154314 A1 | 6/2013 | Romero | |
| 2014/0035337 A1 * | 2/2014 | Jarry | B60N 2/22 |
| | | | 297/344.1 |

\* cited by examiner

VEHICLE SEAT WITH CANTILEVERED HEADREST ASSEMBLY AND POSITIONING SYSTEM

CROSS-REFERENCE TO RELATED APPLICATIONS

The present application claims the benefit to U.S. Provisional patent application Ser. No. 15/846,669 filed on Dec. 19, 2017, which is incorporated herein by reference in its entirety.

FIELD OF THE DISCLOSURE

The present disclosure relates to vehicle seats in general and more particularly to a headrest assembly and with a powered positioning system.

BACKGROUND OF THE DISCLOSURE

Vehicle seats are provided with a headrest which is positioned to occupy the space just above an upper edge of the seat back (backrest) of the vehicle seat. Such vehicle seat headrests are also known as head restraints and are an automotive safety feature, attached or integrated into the top of each vehicle seat. The headrest limits a rearward movement of the occupant's head, relative to the torso, in a collision. This prevents or limits whiplash or other neck and spine injuries.

Headrests are supported relative to the seatback via support posts. These are typically metal posts that pass through an upper surface of the seatback. The arrangement is typically provided with an adjustment feature to adjust at least a height position. Such a height adjustment may be accomplished with adjustment position grooves or notches along a length of the support posts with an engaging feature that engages the groove to set or lock a height position of the headrest relative to the seatback. Such a height (also known as the vehicle Z-direction) position adjustment is needed to account for occupants of various height and size. However, the adjustment is limited. Headrests have been proposed with other possibilities for adjustment, such as in an adjustment in the vehicle forward and rearward direction (typically the vehicle X-direction or direction of travel). However, the configuration with the metal posts at the top of the seatback somewhat limits possibilities for adjustment. Further, with the vehicle seat with the seatback in a full recline position, the position of the headrest surface, facing the occupant's head, may be uncomfortable and not sufficiently support the occupant's head.

SUMMARY OF THE DISCLOSURE

It is an object of the disclosure to provide a headrest assembly which presents better and more comfortable positioning possibilities throughout a full range of motion and positioning of the vehicle seat.

It is another object of the disclosure to provide a vehicle seat with the headrest which provides various positions throughout all positions of the seatback.

It is a further object of the disclosure provide a vehicle seat with a headrest which has a thinner profile then traditional headrest but still provides position changes in multiple directions, namely four or more directions of movement of the headrest.

It is a further object of the disclosure to provide a headrest which is aesthetically pleasing and presents a visual appearance of the headrest floating relative to the seatback and relative to the vehicle seat as a whole.

According to the present disclosure, a headrest assembly is provided for a vehicle seat having a seatback width in a lateral direction and having a forward seating area for a vehicle seat occupant and having a seatback rear side. The headrest assembly comprises a headrest body as well as a first support arm comprising a first arm lower end with a seatback rear support connection to the seatback at the rear side and a cantilevered portion extending upwardly from the first arm lower end and extending in a forward direction to a first headrest connection end and a second support arm comprising a second arm lower end with a seatback rear support connection to the seatback at the rear side and a cantilevered portion extending upwardly from the second arm lower end and extending in a forward direction to a second headrest connection end. The first headrest connection end and the second headrest connection end are spaced apart a distance in the lateral direction to form a support connection. An adjustable connection is provided between the headrest body and the support connection. The adjustable connection comprises a height adjustment assembly for adjusting a position of the headrest body relative to the support connection in a height direction.

The adjustable connection advantageously comprises a motor support supporting a height adjustment motor with a motor output shaft and a pinion connected to the motor output shaft. An up and down toothed rack arrangement is connected to one of the support connection and the headrest body. The motor support is connected to the other of the headrest body and the support connection. The motor with motor output shaft, the pinion connected to the motor output shaft and the up and down toothed rack arrangement form the height adjustment assembly. The pinion engages the up and down toothed rack arrangement to move relative to the rack for adjusting the position of the headrest body relative to the support connection in the height direction. The up and down toothed rack arrangement may be fixed to the headrest. The motor support may support the up and down motor, up and down motor output shaft and the up and down pinion for movement of the headrest relative to the motor support as the up and down pinion moves relative to the up and down rack.

The adjustable connection further advantageously comprises a forward and rearward adjustment assembly for adjusting a position of the headrest body relative to the support connection in a forward and rearward direction of the vehicle seat. The adjustable connection may comprise a forward and rear motor supported by the motor support, with the forward and rear motor having a forward and rear motor output shaft. A forward and rear pinion may be connected to the forward and rear motor output shaft. A forward and rear toothed rack arrangement may be provided. The forward and rear toothed rack arrangement is connected to one of the headrest body and the support connection and the motor support is connected to the other of the headrest body and the support connection. The forward and rear motor with forward and rear motor output shaft, the forward and rear pinion connected to the motor output shaft and the forward and rear toothed rack arrangement form the forward and rear adjustment assembly. The forward and rear pinion engages the forward and rear toothed rack arrangement to move relative to the forward and rear rack and adjusting the position of the headrest body relative to the support connection in the forward and rear direction. The forward and rear toothed rack arrangement may be fixed to the support connection. The motor support may support the forward and rear motor, the rear motor output shaft and the forward and rear pinion for movement of the motor support relative to the support connection as the forward and rear pinion moves relative to the forward and rear rack.

The adjustable connection may further comprise an angular adjustment assembly for adjusting an angular position of the headrest body relative to the support connection. The adjustable connection may comprise an angular adjustment motor with an angular adjustment output shaft. The motor support may comprise a pivot support part connected to the support connection and a headrest pivot part connected to the headrest body for pivoting the headrest body relative to the support connection. An angular adjustment motor with an angular adjustment output shaft may be connected to one of the pivot support part and the headrest pivot part and the output shaft may be connected to the other of the pivot support part and the headrest pivot part to pivot the headrest body relative to the support connection.

The headrest body has an upper forward surface at an angle, between 70 and 110 degrees, relative to a lower forward surface whereby adjusting the angular position of the headrest body relative to the support connection changes a position of a head contact region relative to the upper forward surface and relative to the lower forward surface.

The seatback rear support connection of each of the first support arm and the second support arm may comprises bolts and bolt holes for fastening each of the first support arm and the second support arm to the rear side of a seatback of a vehicle seat.

According to a further aspect of the disclosure, a vehicle seat is provided comprising a seat base and a seatback pivotably connected to the seat base. The seatback has forward seating area for a vehicle seat occupant with a width extending in a lateral direction. The vehicle seat as a headrest assembly according to the present disclosure.

The vehicle seat may further comprise a positioning system comprising an actuator and an operative connection between the actuator and the plurality of drive motors comprising the up down motor, the forward rear motor and the angular adjustment motor in combination with a seatback pivot drive for changing a pivot angle of said seatback between the seatback full upright position and the full recline position. The positioning system is configured to establish and execute a sequenced set of specified seat movements that reposition the headrest body when the seatback is repositioned, based on movements of a plurality of drive motors including said up down motor.

The headrest system according to the present disclosure provides a headrest body which is cantilevered off the seatback structure in a horizontal fashion that properly supports the head in various position of the seat (including a full reclined position). Further, by use of pre-determined pre-sets the positioning system works by moving the headrest a set amount based on the recline angle of the seat. The structure can accommodate 4-way headrest movement, 6-way headrest movement or more without use of the typical metal post structure and sleeves.

The adjustable connection between the headrest body and the support connection is provided with horizontal packaging, particularly motor housings with a powered 4-way mechanism or a powered 6-way mechanism. This allows movement of the headrest body at a desired tilt angle, fore/aft and up down positioning. This enables adjustability logic and sequenced headrest positioning.

The various features of novelty which characterize the disclosure are pointed out with particularity in the claims annexed to and forming a part of this disclosure. For a better understanding of the present disclosure, its operating advantages and specific objects attained by its uses, reference is made to the accompanying drawings and descriptive matter in which preferred embodiments of the disclosure are illustrated.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 5 is a schematic rear perspective view showing a head engaging part of the headrest body with motor support and other features removed;

DETAILED DESCRIPTION OF THE DISCLOSURE

Figure 1:
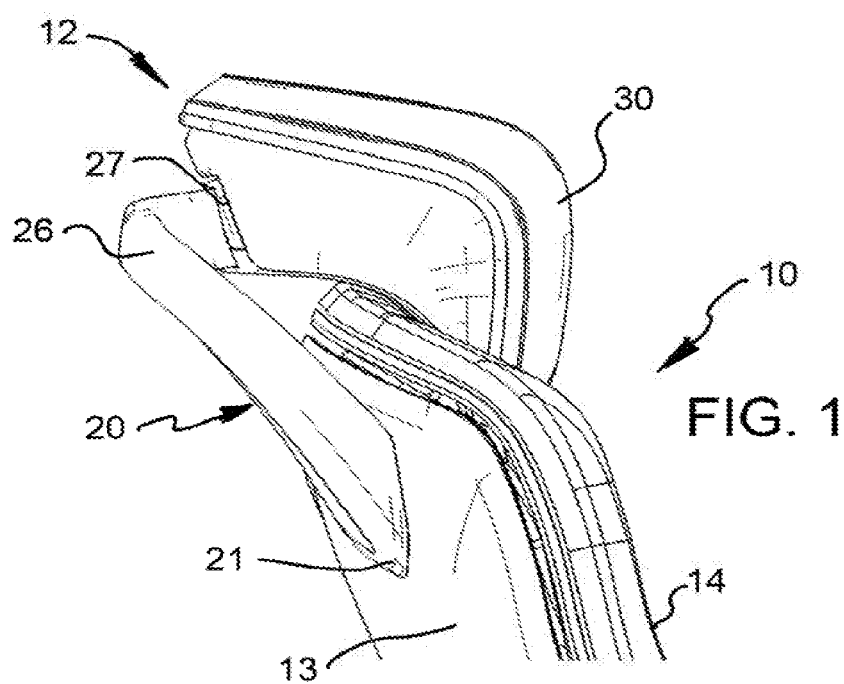
FIG. 1 is a schematic partial side view of the vehicle seat according to a first embodiment of the invention, showing the headrest assembly according to the invention.
Figure 2:
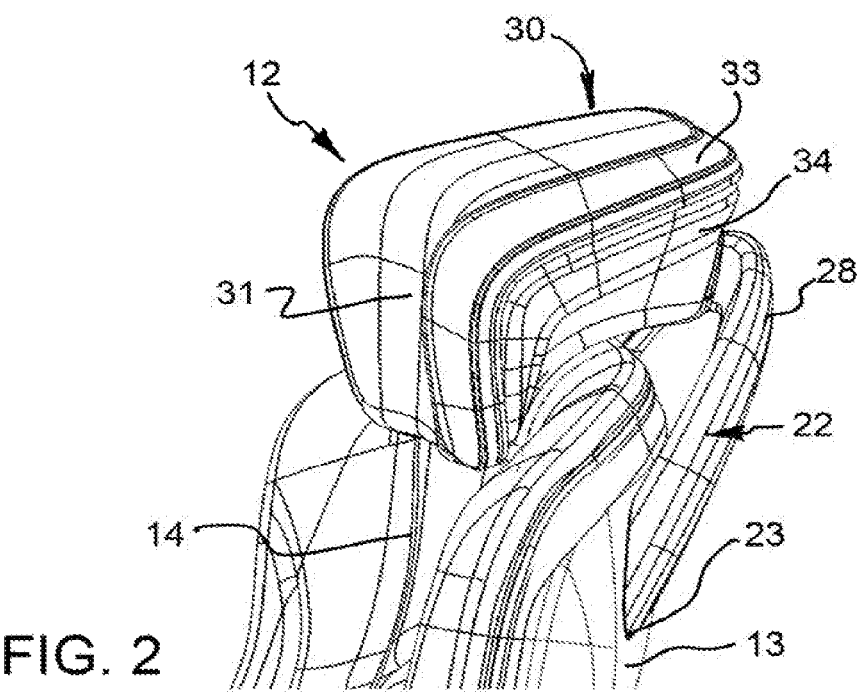
FIG. 2 is a schematic front perspective view of the vehicle seat and headrest assembly of FIG. 1.

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

Referring to the drawings, the invention relates to a headrest assembly generally designated 12. The headrest assembly 12 is part of a vehicle seat generally designated 10 (see FIG. 11). The vehicle seat 10 includes a seatback 14 and a seat base (cushion) 16. The seatback 14 is pivotably connected to the seat base 16 at seatback recline pivot.

The headrest assembly 12 includes a first support arm 20 and a second support arm 22. The first support arm 20 includes a seatback rear support connection 21. The second support arm 22 includes a seatback rear support connection 23. Support arm 20 provides a first cantilevered portion 26 that extends upwardly, behind the seatback 14, and extends in a forward direction to a first headrest connection end 27. Support arm 20 provides a second cantilevered portion 28 that extends upwardly, behind the seatback 14, and extends in the forward direction to second headrest connection end 29. The first headrest connection end 27 and the second headrest connection end 29 are spaced apart a distance in a lateral direction of the vehicle seat 10 to form a support connection 27/29 of the support arms 20 and 22.

Figure 3:
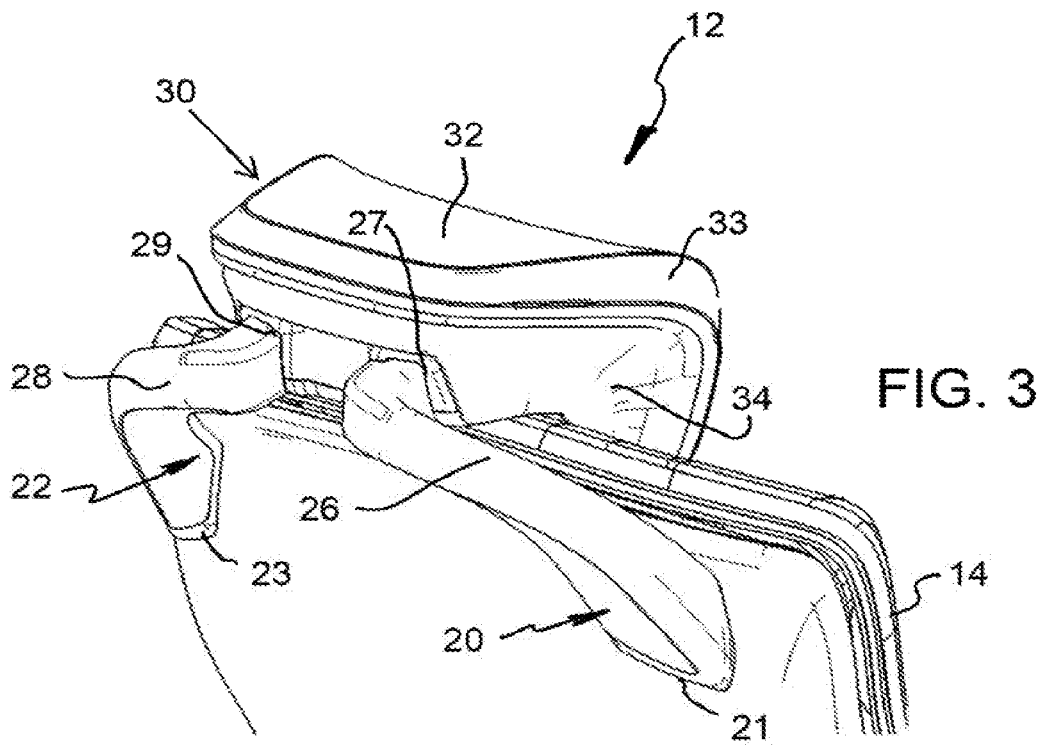
FIG. 3 is a schematic rear perspective view of the vehicle seat and headrest assembly of FIG. 1.

The headrest assembly 12 also includes a headrest body 30 with a front head engaging surface 31 and an upper head engaging surface 32. As discussed below, the headrest body 30 may be positioned to change the engagement between an occupant's head and the surfaces 31 and 32. The headrest body 30 also includes an upper edge portion 33 which transitions to a rear/side cover 34. As can be seen in FIG. 3 the headrest body 30 connects to the connection ends 27 and 29 of the support arms 20 and 22. The support arms 20 and 22 with the cantilevered portions 26/28, provide a support for the headrest body 30 which is based on the seatback rear support connections 21 and 23. This provides a support at a back panel or rear of the seatback frame 13 of the seatback 14. The support provided by support arms 20 and 22 extends from the support connections 21 and 23 to a location of support connection 27/29 that is above a top edge of the seatback 14. This provides a cantilevered headrest support. This configuration provides unique comfort aspects particularly in combination with the upper forward surface or front head engaging surface 31 at an angle, between about 70 degrees and 110 degrees and is 93 degrees as shown, relative to a lower forward surface or upper head engaging surface 32.

Figure 7:
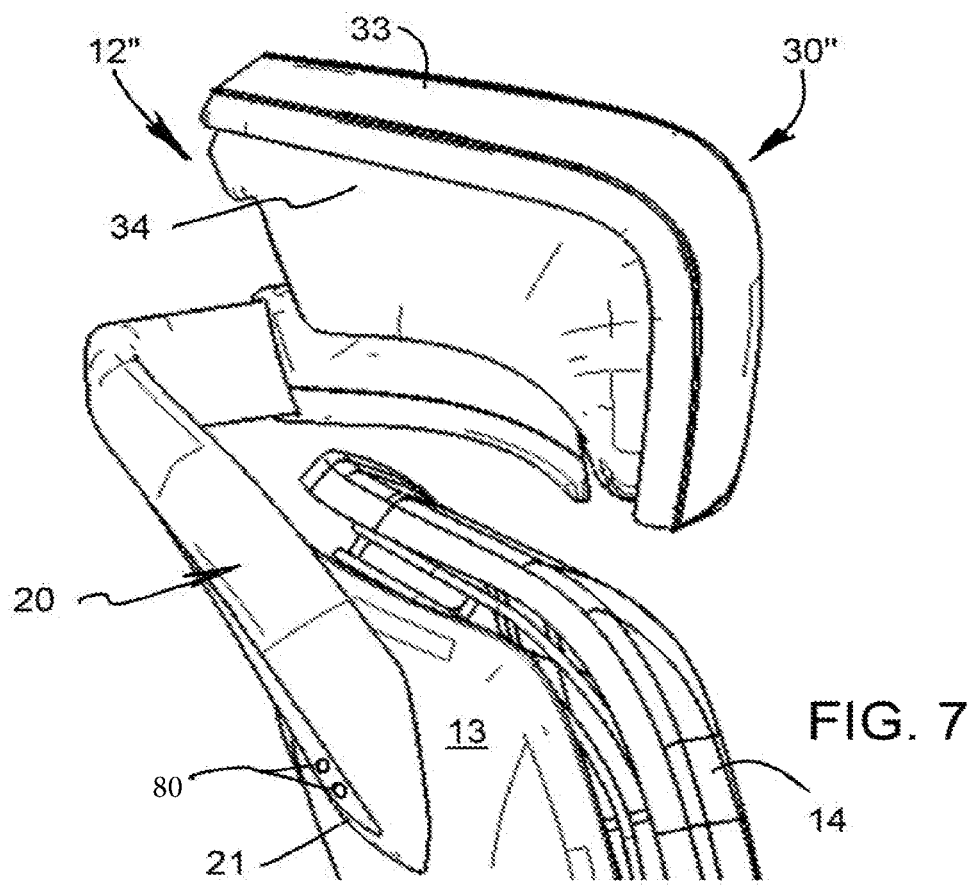
FIG. 7 is a schematic side view, similar to FIG. 1, showing a vehicle seat according to a third embodiment of the invention with the headrest body in a raised and forward position and which has an external appearance that is essentially the same as the external appearance of the headrest assembly of FIG. 1.

FIGS. 1, 2, 3 and 4 show the headrest assembly 12 with the headrest body 30 in a lowermost position (with respect to a vertical-vehicle Z-direction). FIG. 7 shows an embodiment of a headrest body in a raised and forward position (forward with respect to the orientation of the vehicle seat 10, which may also be the vehicle X-direction or travel direction). The views show positioning aspects of the headrest assembly 12 according to the invention.

Figure 4:
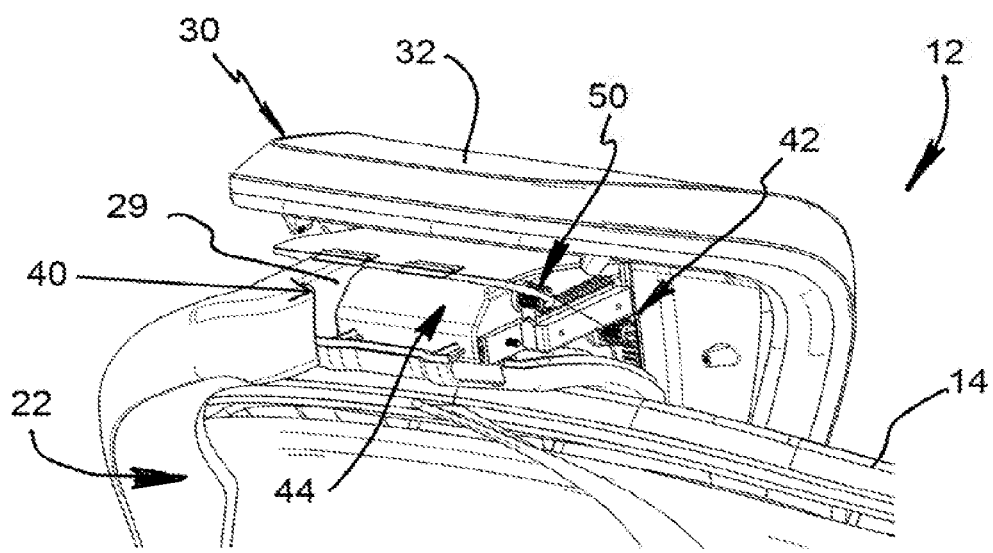
FIG. 4 is a schematic rear perspective view, corresponding to the view of FIG. 3, showing the headrest body with a rear cover removed and with the right support arm removed.

The headrest assembly 12 includes an adjustable connection assembly, generally designated 40 that is provided between the headrest body 30 and the support connection of the connection ends 27 and 29 of the support arms 20 and 22. In FIG. 4, the right side support arm 20 is removed as well as the headrest rear/side cover 34, to better show some aspects of the adjustable connection assembly 40. Most essentially, the adjustment connection assembly 40 includes a height adjustment assembly, generally designated 42, for adjusting the position of the headrest body 30 relative to the support connection 27/29 in a height direction (vehicle Z-direction). This allows the headrest body 30 to be moved up and down relative to the backrest 14, to adjust the height of the headrest body 30 to accommodate an occupant of the vehicle seat 10.

The adjustable connection assembly 40 includes a motor support (motor box/motor housing) 44 connected to the support connection 27/29. The motor support 44 supports a height adjustment motor 72 with up and down motor output shaft 46 and pinions (pinion gears) 48, connected to each of two ends of the up and down motor output shaft 46, of the height adjustment assembly 42. The height adjustment assembly 42 also comprises a two rack up and down toothed rack arrangement 49. FIG. 5 shows that the up and down toothed rack arrangement 49 is connected to a front head engaging part of the headrest body 30. The motor support 44, supports the up and down motor 72 with the up and down motor output shaft 46 such that the pinions 48 engage the two racks of the up and down toothed rack arrangement 49 to move relative to the up and down toothed rack arrangement 49 to adjust a position of the headrest body 30 relative to the support connection 27/29 in the height direction. This configuration provides for movement of the headrest body 30 relative to the motor support 44 as the up and down pinion 48 moves relative to the up and down rack arrangement 49. As shown the up and down toothed rack arrangement 49 is fixed to the headrest body 30 and the motor support 44 supports the up and down motor 72, the up and down motor output shaft 46, and the up and down pinions 49. The motor support 44 is fixedly connected to the support connection 27/29 with respect to the height direction. However, this configuration may be reversed. Other variations of the height adjustment assembly 42 are possible, in conjunction with modifications of the other adjustment features described.

The adjustable connection assembly 40 further includes forward and rearward adjustment assembly 50 for adjusting a position of the headrest body 30 relative to the support connection 27/29 in a forward and rearward direction of the vehicle seat 10. The adjustable connection assembly 40 further comprises a forward and rear motor 71 supported by the motor support 44 as part of the forward and rearward adjustment assembly 50. The motor 71 has a forward and rear motor output shaft 51 with a forward and rear pinion 52 connected to the forward and rear motor output shaft 51. The forward and rearward adjustment assembly 50 further includes a forward and rear toothed rack arrangement 53. The forward and rear toothed rack arrangement 53 includes racks that are each fixed on one of rail supports 57 that are fixed to the support connection 27/29. The motor support 44 supports the forward and rear motor 71, the forward and rear motor output shaft 51 and the forward and rear pinion 52 for movement of the motor support 44 relative to the support connection 27/29 as the forward and rear pinion 52 moves relative to the forward and rear toothed rack arrangement 53. However, other configurations of the forward and rearward adjustment assembly 50 may be provided. The forward and rear pinion 52 is advantageously connected to one of the headrest body 30 and the support connection 27/29 and the motor support 44 is connected to the other of the headrest body 30 and the support connection 27/29.

Figure 6A:
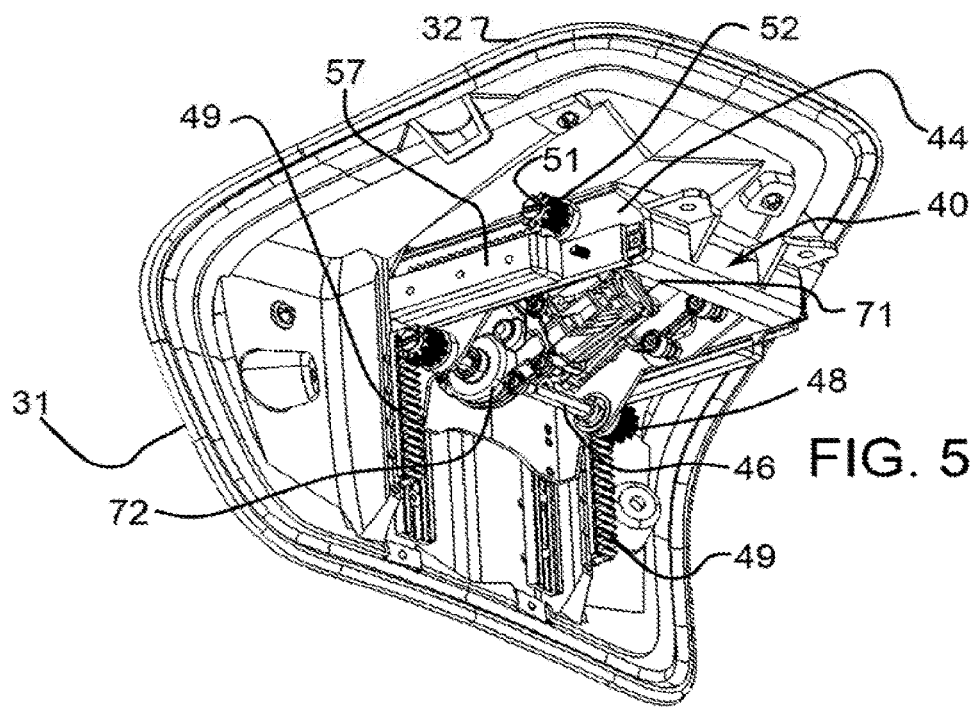
FIG. 6A is a upper perspective and partially schematic view according to a second embodiment of the invention, showing drive features in a first position.
Figure 6B:
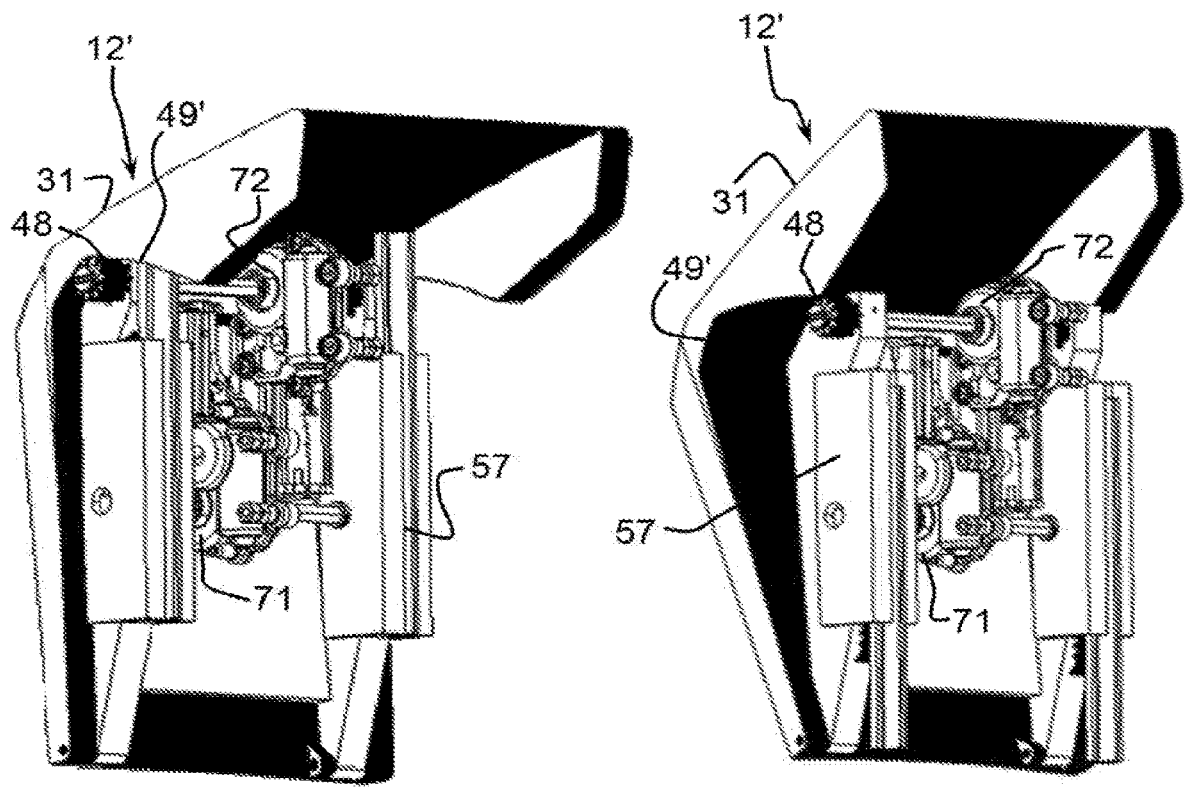
FIG. 6B is a upper perspective and partially schematic view according to the second embodiment of the invention, showing drive features in a second position.

FIGS. 6A and 6B show a headrest assembly 12' according to a second embodiment of the invention. The headrest assembly 12' is essentially identical to the embodiment of FIGS. 1-5 except the tack arrangement 49 is replaced with a curved track arrangement 49. This results in an alternative height adjustment assembly that adjusts the headrest body in both the Z-direction and also change a tilt angle or inclination angle θ of the headrest body. This can be appreciated by comparing FIG. 6A and FIG. 6B, which show the angle of the surface 31 changing based on the position of the pinions 48 along the track arrangement 49'.

Figure 10:
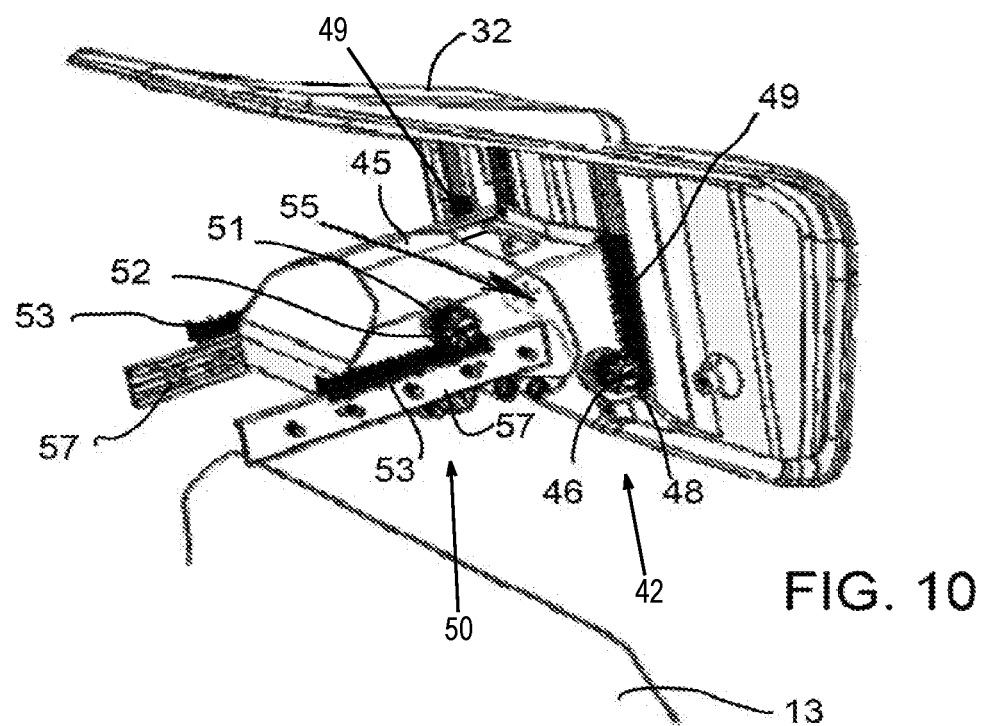
FIG. 10 is a schematic view of the headrest assembly according to FIG. 8, showing a portion of the backrest and showing the headrest assembly with both support arms removed, with the rear cover removed and with an upper edge portion removed.

FIG. 7 shows a headrest assembly 12" according to a third embodiment of the invention. The headrest assembly 12" has an external appearance that is identical to the headrest assembly 12 (as well as the headrest assembly 12') and essentially shows each of headrest assemblies 12, 12' and 12" in a full forward and full up position relative to the seatback 14. The features of the height adjustment assembly 42 and the forward and rearward adjustment assembly 50 are essentially the same but the an adjustable connection assembly 40" includes a motor support (motor box/motor housing) 44' that advantageously includes a pivot support part 45 connected to the support connection 27/29 and a headrest pivot part 45 connected to the headrest body 30 for pivoting the headrest body 30 relative to the support connection 27/29. The motor 71 of the forward and rearward adjustment assembly 50 is carried by the pivot support part 45 (FIG. 10). The motor support 44 supports the height adjustment motor 72 with up and down motor output shaft 46 and pinions (pinion gears) 48, connected to each of two ends of the up and down motor output shaft 46, of the height adjustment assembly 42. The up and down toothed rack arrangement 49 is connected to the headrest body 30.

Figure 9:
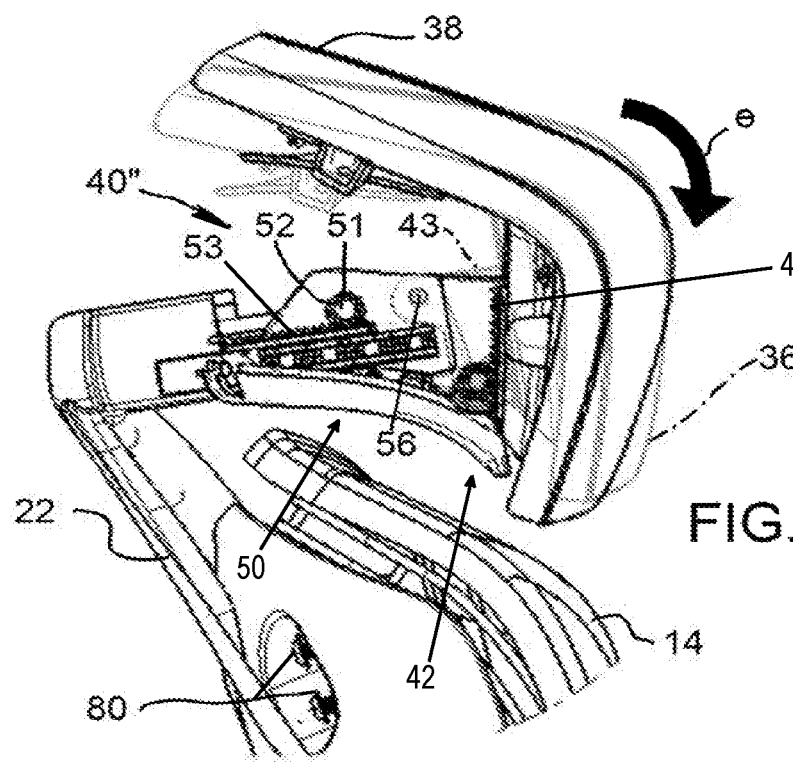
FIG. 9 is a schematic side view of the headrest assembly according to FIG. 8, showing the headrest body pivoted to a lowered headrest body angle (pivoted in a clockwise direction as viewed), and also showing the position of the headrest body, at the tilt position of FIG. 8, in phantom line.

FIG. 9 shows a pivoting of the headrest body 30" with respect to the seatback 14 and with respect to the support connection provided by the first headrest connection end 27 and the second headrest connection end 29. Advantageously, the headrest assembly 12" is provided with six directions of movement, namely in a forward and rearward direction (vehicle X-direction), an up-and-down or height direction (vehicle Z-direction) and with a counterclockwise direction (upward tilt) and clockwise direction pivot (downward tilt) to change the tilt angle or inclination angle θ. This last feature allows the occupant to position the headrest body 30" between a full tilt back position 36 and a full tilt forward position 38. The angle of the head engaging surface 31 relative to the upper surface 32 is between about 70 degrees and 110 degrees and is 93 degrees as shown. With this configuration adjusting the angular position (or tilt/inclination angle θ) of the headrest body 30 relative to the support connection 27/29 changes a position of a head engaging surface 31 and the upper surface 32 and relative to the occupant.

To provide the tilt angle adjustment feature the adjustable connection assembly 40" further comprises an angular adjustment assembly 55 for adjusting an angular position (tilt/inclination angle θ) of the headrest body relative to the support connection 27/29. The angular adjustment assembly 55 of the adjustable connection assembly 40" comprises an angular adjustment motor 73 with an angular adjustment output shaft 56 (FIG. 9). The motor support 44 comprises the pivot support part 45 connected to the support connection 27/29 and the headrest pivot part 43 connected to the headrest body 30. The angular adjustment motor 73 is supported by the pivot support part 45 with the angular adjustment output shaft 56 with an output end that is fixed to the headrest pivot part 43. The rotation of the angular adjustment output shaft 56 by the angular adjustment motor 73 pivots the headrest pivot part 43 up or down, depending upon the direction the angular adjustment motor 73 turns. This configuration allows for a pivoting of the headrest body 30 relative to the support connection 27/29. The angular adjustment motor 73 with the angular adjustment output shaft 56 is fixed to the pivot support part 45 in the embodiment shown. However, other configurations of the angular adjustment assembly 55 may be provided. The angular adjustment assembly 55 may be provided with the angular adjustment motor 73 with the angular adjustment output shaft 56 supported by the headrest pivot part 43. In such case the forward and rear motor output shaft 51 has its output end fixed to the pivot support part 45 to pivot the headrest body 30, along with the angular adjustment motor 73 relative to the support connection 27/29.

Although a powered position adjustment system with motors 71, 72, 73, . . . 79 is shown and described in detail, a manually actuated position adjustment system may be provided instead. For example, the toothed rack arrangements 49 and 53 may be maintained, or a similar toothed structure may be provided. The pinions are replaced by spring-loaded latches. These may be manually actuated to disengage the respective latch from the rack arrangement, to allow repositioning. The spring of the spring-loaded latches biases the latch back into an engaged position, to fix the Z-position and the X-position respectively. For the manual tilt/inclination angle θ adjustment feature a curved toothed rack is supported by one of the parts 43 and 45 with this being again engaged by a spring-loaded latch, that is fixed to the other of the parts 43 and 45, to fix the position. By manually actuating the spring-loaded latch, the latch is disengaged from the curved tooth rack to allow the pivoting of the headrest pivot part 43 relative to the pivot support part 45.

Figure 8:
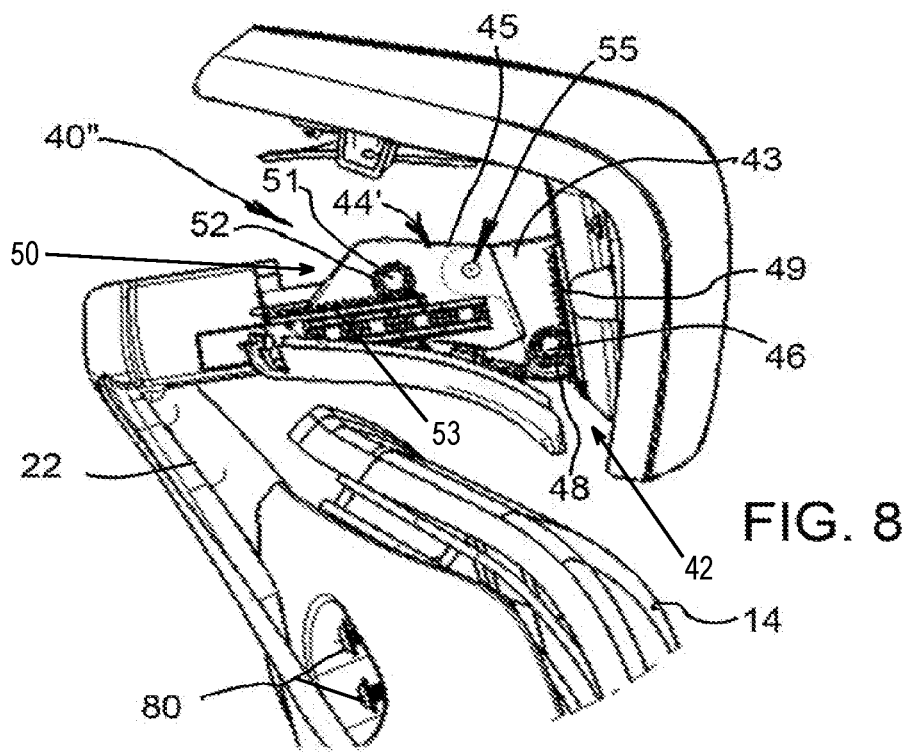
FIG. 8 is a schematic side view showing a headrest assembly according to the third embodiment of the invention with the position of the headrest corresponding to the view of FIG. 7 and showing the headrest body with the rear cover removed and with the right support arm removed.

FIGS. 8 and 9 show the seatback 14 with the support arm 20 removed. The seatback 14 has a back panel or the seatback frame 13 that has a bolt and bolt hole arrangement 80 to cooperate with the seatback rear support connection 21, which has bolt receiving holes 82, schematically shown in FIG. 5. The same configuration is mirrored at the seatback frame 13 for the seatback rear support connection 23 of the support arm 22. Each of the embodiments employ the support arms 20 and 22 with the rear support connections 21 and 23 cooperating with a bolt hole arrangement 80.

Figure 11:
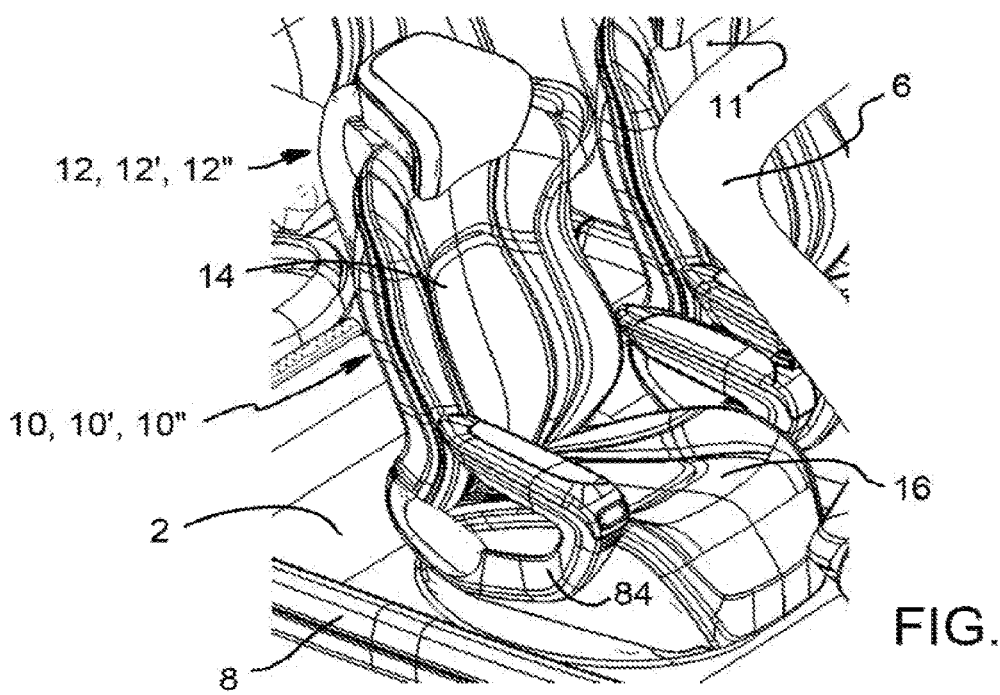
FIG. 11 is a schematic perspective view showing the vehicle seat according to the invention positioned in a vehicle.

As shown in FIG. 11, the vehicle seat 10, 10', 10" may be provided positioned on a vehicle floor 2 in a vehicle 8 that includes a front windshield frame 6, supporting a windshield. An identical vehicle seat 11 is shown positioned as the driver's seat. The vehicle 8 includes a door opening which is shown for any typical or known vehicle door (not shown). As shown, the windshield frame 6 is at the front of the vehicle 8. The vehicle seat 10, 10', 10" is shown in a forward facing position (with regard to a direction of travel). The vehicle seat 10, 10', 10" may be moved between a full upright position and a full recline position. With this there may be a powered and predefined (preset) relationship of the position of the headrest body 30 with respect to the position of the seatback 14. For example an occupant may set the relationship such that even in the full recline position, the head is supported so as to be able to look forward through the windshield. Various combinations of headrest body tilt angle θ adjustment, X-position adjustment, and Y-position adjustment may be coordinated with various recline positions including a full upright position, a design position and a full recline position as well as with any other vehicle seat positioning motors.

Advantageously the vehicle seat includes a powered positioning system 90 such that the vehicle seat 10, 10', 10" can be adjusted in numerous ways to achieve various positions for comfort or functional purposes. The movement advantageously includes combined movements including a change of the recline angle of the seatback 14 with changes in the tilt angle θ, the X-position and/or the Y-position of the headrest body 30. The positioning system 90 includes a plurality of drive motors 71 ($M_X$), 72 ($M_Z$), 73 ($M_\theta$) ... 74 ($M_n$) effecting the position changes. For example, a pivoting of the seatback 14 relative to the seat base 16 and a rotating (swiveling) of the vehicle seat 10 changes the facing position (such as to the side for ingress/egress). The seat cushion 16 may be mounted for positional adjustment. The drive motors 71 ($M_X$), 72 ($M_Z$), 73 ($M_\theta$) change the position of the headrest body 30 of the headrest assembly 12 (height position, position in the four aft direction and angular tilt position) as described. Additionally, a drive motor $M_n$ and a drive connection may be provided to reposition the angle of an upper surface of the armrest 84.

Figure 12:
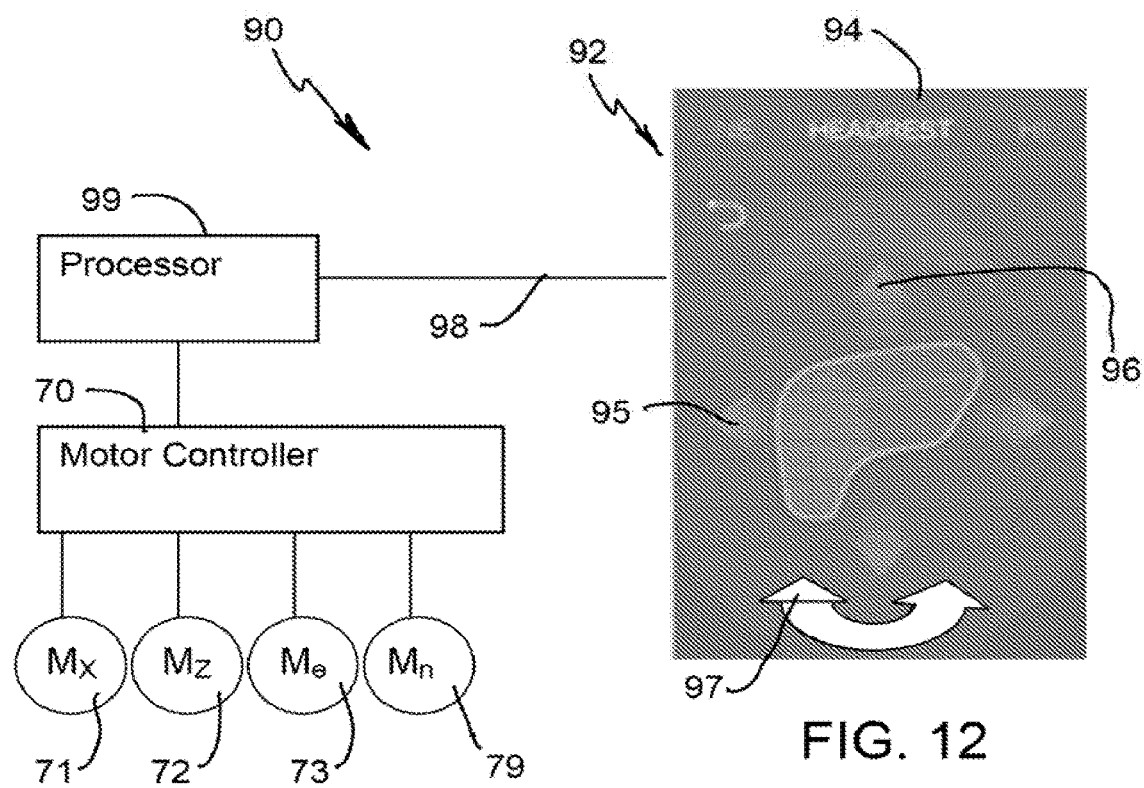
FIG. 12 is a schematic view showing a positioning system according to the invention.

As shown in FIG. 12, the position system 90 includes an actuator 92 with an actuator human interface shown as active interface 94 with touch display built into the armrest 84. The interface 94 may have electrical (data/power) connection which extends through the intermediate portion of the armrest 84 to an electrical connection near the recline pivot. Features of the actuator 92 and interface 94 are described in further detail in a related application entitled RETRACTING SEAT CONTROL INTERFACE, attached hereto as an appendix and incorporated herein by reference in its entirety. The actuator 92 with actuator interface or control interface 94 may be operatively connected via actuator to processor connection 98 to a processor 99 or the like. The processor 99 both controls the display content of the interface 94 and also receives signals from the interface 94 to control the motors 71, 72, 73, ... 74, via motor controller 70. The processor connection 98, the processor 99 and the motor controller 70 present just one example of an operative connection between the actuator the plurality of drive motors.

Interface 94 is shown in a manual mode, wherein each position adjustment may be selected for the headrest body 30 30". The interface 94 includes X-position soft keys 95 for actuating the motor 71 in one of two rotational directions, Y-position soft keys 96 for actuating the motor 72 in one of two rotational directions and a θ-position soft key 97 for actuating the motor 73 in one of two rotational directions. The interface 94 allows the occupant to select a changeover to other interfaces (for position change actuation for other vehicle seat features). The other interface screens may allow a selection of preset movements to preset positions. Further, other features such as sensors or state signals from the vehicle 8 may change the position of the vehicle seat 10, 10', 10" and the headrest body 30, 30" or bring about movement of the vehicle seat 10, 10', 10" and the headrest body 30, 30". For example, changing the recline angle of the seatback 14 may result in the processor 99 sending signals to the motor controller 70 of any of the particular motors 71 ($M_X$), 72 ($M_Z$), 73 ($M_\theta$) ... 74 ($M_n$) of the vehicle seats 10, 10', 10", 11 etc., to position the vehicle seat 10, 10', 10" or 11 and/or the headrest body 30, 30" thereof. This could for example be repositioning wherein the driver must take over control of the vehicle 8 from the autonomous driving system of the vehicle 8. Pre-set positions may also be provided based on the identity of the occupant.

The interface 94 of the actuator 92 is not restricted to the touch screen example shown and described above. Instead, the processor may be connected via the actuator 92 to processor connection 98 to a Bluetooth, Wi-Fi, or other wireless or network interface. In this case, the actuator 92 could be an application on a smart phone. Further, information about the identity of the occupant may be entered at some other interface of the vehicle 8 whereby the vehicle seat 10, 10', 10" that the identified occupant sits in or is to sit in will move to various positions in a defined way, including adjusting the position of the headrest body in the X, Y and θ-directions. The interface may be a microphone with voice recognition processing at the processor to provide a voice activated change in position and/or a voice activated assignment of the seat to a particular identified occupant with prior saved preferences and sequenced movements. The particular voice of the occupant may also be matched to a data base or otherwise recognized to identify the occupant.

While specific embodiments of the invention have been shown and described in detail to illustrate the application of the principles of the invention, it will be understood that the invention may be embodied otherwise without departing from such principles.

What is claimed is:

1. A headrest assembly for a vehicle seat, said headrest assembly comprising:
   one or more support arms connected to a seatback frame;
   a headrest body; and
   an adjustable connection assembly including a height adjustment assembly, wherein said adjustable connection assembly connects at least a portion of said one or more support arms to at least a portion of said headrest body, wherein said adjustable connection assembly allows said headrest body to at least one of to move in a forward direction and a rearward direction, to move in an upward direction and a downward direction, and to pivot relative to said seatback frame, and wherein said height adjustment assembly comprises one or more up and down toothed rack arrangements directly coupled to at least a portion of said headrest body.

2. The headrest assembly of claim 1, wherein said height adjustment assembly further comprises:
   one or more height adjustment motors;
   one or more output shafts drivingly connected to at least a portion of said one or more height adjustment motors; and
   one or more pinion gears drivingly connected to at least a portion of said one or more output shafts of said height adjustment assembly, wherein at least a portion of said one or more pinion gears of said height adjustment assembly is meshingly engaged with at least a portion of said one or more up and down toothed rack arrangements of said height adjustment assembly.

3. The headrest assembly of claim 2, further comprising a motor support, wherein said motor support provides support for at least a portion of said one or more height adjustment motors of said height adjustment assembly.

4. The headrest assembly of claim 1, further comprising a forward and rearward adjustment assembly, wherein said forward and rearward adjustment assembly allows said headrest body to move in said forward direction and said rearward direction.

5. The headrest assembly of claim 4, wherein one or more motors drive said forward and rearward adjustment assembly in said forward direction and said rearward direction.

6. The headrest assembly of claim 4, wherein said forward and rearward adjustment assembly comprises:
   one or more forward and rear toothed rack arrangements;
   one or more motors;
   one or more motor output shafts drivingly connected to at least a portion of said one or more motors of said forward and rearward adjustment assembly; and
   one or more pinion gears drivingly connected to at least a portion of said one or more motor output shafts of said forward and rearward adjustment assembly, wherein at least a portion of said one or more pinion gears of said forward and rearward adjustment assembly are meshingly engaged with at least a portion of said one or more forward and rear toothed rack arrangements of said forward and rearward adjustment assembly.

7. The headrest assembly of claim 4, wherein said forward and rearward adjustment assembly comprises one or more rail supports, wherein at least a portion of said one or more rail supports are connected to at least one of at least a portion of said one or more support arms and at least a portion of a motor support.

8. The headrest assembly of claim 7, wherein at least a portion of one or more forward and rear toothed rack arrangements are connected to at least a portion of said one or more rail supports.

9. The headrest assembly of claim 1, further comprising a headrest pivot part connected to at least a portion of a pivot support part allowing headrest body to pivot relative to said seatback frame, wherein at least a portion of said headrest pivot part is connected to at least a portion of said headrest body, and wherein at least a portion of said pivot support part is connected to at least one of at least a portion of one or more support rails and to at least a portion of said one or more support arms.

10. The headrest assembly of claim 1, further comprising:
a headrest pivot part;
a pivot support part connected to at least a portion of said headrest pivot part; and
an angular adjustment motor, wherein said angular adjustment motor selectively transitions said headrest body between a forward tilt position and a tilt back position.

11. The headrest assembly of claim 10, wherein said angular adjustment motor is fixed relative to said pivot support part.

12. The headrest assembly of claim 10, wherein said angular adjustment motor has an angular adjustment output shaft, and wherein at least a portion of an end of said angular adjustment output shaft opposite said angular adjustment motor is connected to at least a portion of said headrest pivot part.

13. The headrest assembly of claim 1, wherein said headrest body has an upper head engaging surface and a head engaging surface.

14. The headrest assembly of claim 1, wherein said headrest body is able to pivot manually relative to said seatback frame by selectively actuating one or more spring-loaded latches.

15. The headrest assembly of claim 1, wherein said one or more support arms have a cantilevered portion.

16. A headrest assembly for a vehicle seat, said headrest assembly comprising:
one or more support arms connected to a seatback frame;
a headrest body; and
an adjustable connection assembly, said adjustable connection assembly including a forward and rearward adjustment assembly, wherein said adjustable connection assembly connects at least a portion of said one or more support arms to at least a portion of said headrest body, wherein said adjustable connection assembly allows said headrest body to at least one of to move in a forward direction and a rearward direction, to move in an upward direction and a downward direction, and to pivot relative to said seatback frame, wherein said forward and rearward adjustment assembly allows said headrest body to move in said forward direction and said rearward direction, and wherein said forward and rearward adjustment assembly comprises:
one or more forward and rear toothed rack arrangements;
one or more motors;
one or more motor output shafts drivingly connected to at least a portion of said one or more motors of said forward and rearward adjustment assembly; and
one or more pinion gears drivingly connected to at least a portion of said one or more motor output shafts of said forward and rearward adjustment assembly, wherein at least a portion of said one or more pinion gears of said forward and rearward adjustment assembly are meshingly engaged with at least a portion of said one or more forward and rear toothed rack arrangements of said forward and rearward adjustment assembly.

17. The headrest assembly of claim 16, wherein said one or more motors drive said forward and rearward adjustment assembly in said forward direction and said rearward direction.

18. The headrest assembly of claim 16, further comprising a height adjustment assembly, wherein said height adjustment assembly comprises one or more up and down toothed rack arrangements connected to at least a portion of said headrest body.

19. The headrest assembly of claim 18, wherein said height adjustment assembly further comprises:
one or more height adjustment motors;
one or more output shafts drivingly connected to at least a portion of said one or more height adjustment motors; and
one or more pinion gears drivingly connected to at least a portion of said one or more output shafts of said height adjustment assembly, wherein at least a portion of said one or more pinion gears of said height adjustment assembly is meshingly engaged with at least a portion of said one or more up and down toothed rack arrangements of said height adjustment assembly.

20. A headrest assembly for a vehicle seat, said headrest assembly comprising:
one or more support arms connected to a seatback frame;
a headrest body;
an adjustable connection assembly including a height adjustment assembly, wherein said adjustable connection assembly connects at least a portion of said one or more support arms to at least a portion of said headrest body, wherein said adjustable connection assembly allows said headrest body to at least one of to move in a forward direction and a rearward direction, to move in an upward direction and a downward direction, and to pivot relative to said seatback frame, and wherein said height adjustment assembly comprises one or more up and down toothed rack arrangements directly coupled to at least a portion of said headrest body; and
a forward and rearward adjustment assembly, wherein said forward and rearward adjustment assembly allows said headrest body to move in said forward direction and said rearward direction, wherein said forward and rearward adjustment assembly comprises:
one or more rail supports, wherein at least a portion of said one or more rail supports are connected to at least one of at least a portion of said one or more support arms and at least a portion of a motor support, and wherein at least a portion of one or more forward and rear toothed rack arrangements are connected to at least a portion of said one or more rail supports.

* * * * *